(12) United States Patent
Weiss et al.

(10) Patent No.: US 6,886,854 B2
(45) Date of Patent: May 3, 2005

(54) CONFIGURATION OF AN AIRBAG MODULE AND AIRBAG ASSEMBLY PROCESS

(75) Inventors: Olaf Weiss, Kranzberg (DE); Martin Heinl, Bad Toelz (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/655,134

(22) Filed: Sep. 5, 2003

(65) Prior Publication Data

US 2004/0124616 A1 Jul. 1, 2004

Related U.S. Application Data

(63) Continuation of application No. PCT/EP02/02153, filed on Feb. 28, 2002.

(30) Foreign Application Priority Data

Mar. 30, 2001 (DE) .......................................... 101 15 803

(51) Int. Cl.$^7$ .............................................. B60R 21/16
(52) U.S. Cl. .................. 280/732; 280/728.2; 280/728.3
(58) Field of Search .............................. 280/732, 728.2, 280/728.3

(56) References Cited

U.S. PATENT DOCUMENTS 5,816,609 A * 10/1998 Gray et al. ............... 280/728.3

6,250,669 B1   6/2001  Ohmiya ....................... 280/732

FOREIGN PATENT DOCUMENTS

DE   19949170 A1   4/2000
DE   19913041 A1   9/2000

OTHER PUBLICATIONS

German Search Report.
International Preliminary Examination Report with partial English translation.

* cited by examiner

*Primary Examiner*—Eric Culbreth
(74) *Attorney, Agent, or Firm*—Crowell & Moring LLP

(57) ABSTRACT

In a configuration for an airbag module behind the instrument panel of a motor vehicle, a charge channel for the airbag is mounted on the back side of the instrument panel, while the airbag module is held by an axle tube of the vehicle body. The charge channel loosely encompasses the airbag deployment opening of the airbag module. A catch on the charge channel acts in conjunction with a hook component fastened to the suspension tube in such a way that bending of the instrument panel in the direction of the passenger compartment is limited when the airbag is deployed. In this manner, an orderly unfolding of the airbag is ensured. Additionally, the separate configuration of the charge channel and the airbag module is not susceptible to component tolerances.

11 Claims, 1 Drawing Sheet

CONFIGURATION OF AN AIRBAG MODULE AND AIRBAG ASSEMBLY PROCESS

This is a continuation of International Application PCT/EP02/02153, with an international filing date of Feb. 28, 2002, the entire disclosure of which is incorporated herein by reference.

This application also claims the priority of German application 101 15 803.3, filed Mar. 30, 2001.

BACKGROUND AND SUMMARY OF THE INVENTION

This invention relates to a configuration of an airbag module behind the instrument panel of a motor vehicle.

One configuration of this type is known from German publication DE 199 13 041 A1. The airbag module is mounted on a transversely running tube in front of the car body structure. The folded airbag lies within a hollow component behind the instrument panel. The hollow component passes into an adapter tube that serves as a charge channel and is mounted on the back side of the instrument panel. A configuration of this type has the disadvantage that the tolerances between the tube in front of the car body structure and the instrument panel must be adjusted relative to the mounting components of the airbag module. Furthermore, suitable measures must be taken to keep the relative motion between the instrument panel and the airbag unit as small as possible when the airbag is deployed. Otherwise there is a danger of the airbag becoming entangled and possibly deploying partially behind the instrument panel.

One object of this invention is to design an airbag module configuration which can be easily mounted without special consideration for component tolerances and, when the airbag is deployed, which has relative motion between the instrument panel and the airbag unit that remains within bounds.

According to the invention, the charge channel and the airbag module are separated from one another. The charge channel is mounted on the rear side of the instrument panel, while the airbag module is fastened to the body, preferably to a support tube of the body structure. In this manner, the airbag module can be mounted first, after which the instrument panel can be installed. In this way, the charge channel that is mounted on the rear side of the instrument panel is placed over the airbag exit area for the airbag module. The two components are not fastened to one another and can shift relative to one another, which could lead to the above-mentioned undesirable relative motion when the airbag is deployed. This is prevented, however, by a catch on the charge channel and by a hook component fixed to the body. Both components are arranged such that when the airbag is deployed, the hook component holds the charge channel by way of the catch.

Advantageous designs of the invention are provided in the following description, with reference to pertinent drawings.

DETAILED DESCRIPTION OF THE INVENTION

Figure 1:
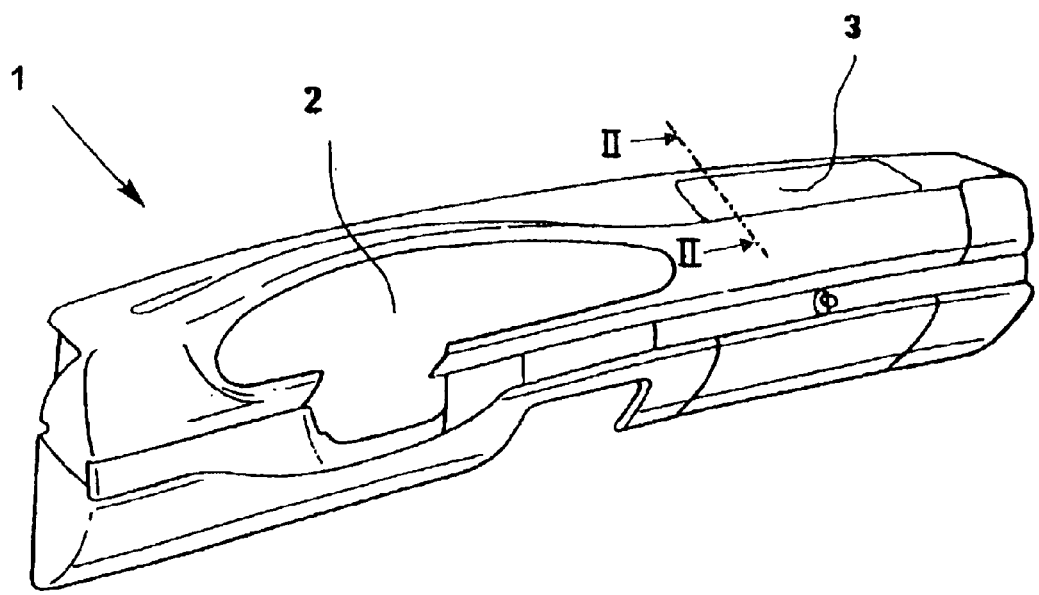
FIG. 1 is a perspective representation of an instrument panel of a motor vehicle.

The instrument panel 1 of a motor vehicle shown in FIG. 1 is only a schematic representation; in other words, the essential built-in components, such as instruments, etc., are omitted. The sections of the body that enclose the instrument panel also have been omitted. On the driver's side, however, an opening 2 is shown with an upper area that holds the instruments when the instrument panel has been fully installed. A lower section of the opening 2 is designed to accommodate a steering column, which is not illustrated here.

On the passenger side, the instrument panel 1 is equipped with an opening that is closed with a cover plate 3; that opening allows the deployment of an airbag which is part of an airbag module that will be described in greater detail later. In FIG. 1, the cover plate 3 appears as a door that is separate from the remaining outer shell of the instrument panel 1. However, this mode of representation has been selected merely for purposes of clarity to localize the point of deployment of the airbag. In reality, as is shown in FIG. 2, the cover plate is an integral component of the outer shell and is weakened in its cross-section only on its back side by a circular groove 4.

Figure 2:
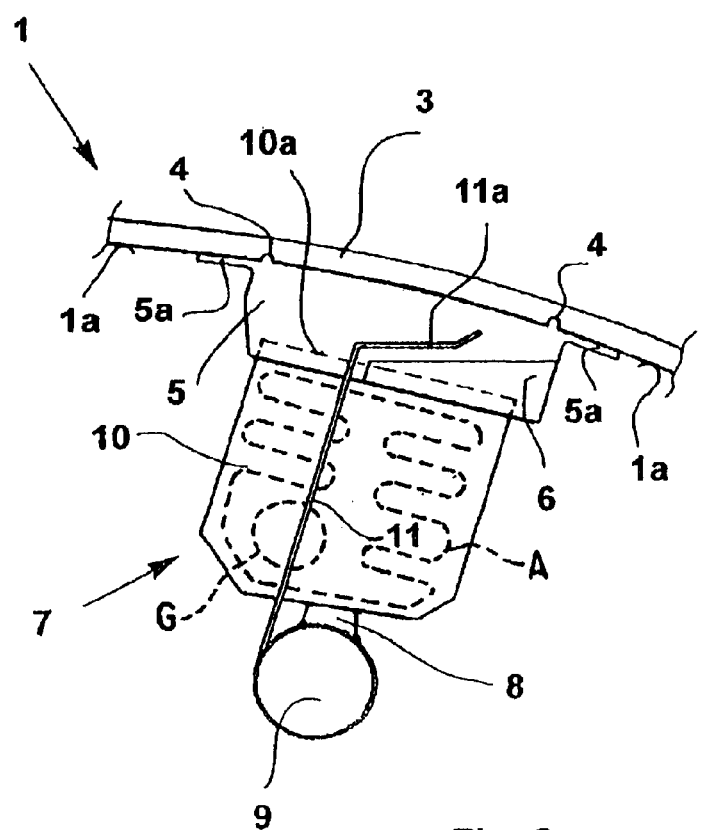
FIG. 2 is a sectional view along section line II—II of FIG. 1 but on a larger scale.

FIG. 2 also shows a charge channel 5, which is fastened via the mounting sections 5a to the back side 1a of the instrument panel 1. The charge channel 5 has the shape of a rectangular channel (not apparent in FIG. 2), and is dimensioned such that it encompasses the cover plate 3 with clearance at a close interval. The cover plate 3 thus lies completely within the channel opening. On the outer side, one channel wall is shaped to form a lock 6 which, in the direction of the channel, slopes toward the back side of the instrument panel.

An airbag module 7 is mounted to a support tube 9 via an anchor 8. The support tube 9 is part of the forward body structure of the motor vehicle, and runs transversely to the direction of travel, toward the two A-columns of the body. The airbag module 7 is comprised in a generally known manner of at least a schematic gas generator G and an airbag A, which lies folded within a housing 10. Normally, the gas generator is also located in the housing 10; however it may also be housed in another position, for example in the support tube 9.

The upper section of the housing 10, which faces the back side 1a of the instrument panel 1, is equipped with a deployment opening 10a for the airbag. As can be seen in FIG. 2, the deployment opening 10a lies within the charge channel 5 which, in turn, loosely encompasses the housing 10, and accordingly is not mounted on the housing 10.

A hook component 11 is mounted to the support tube 9 and extends along the housing 10 in the direction of the back side of the instrument panel 1. In the area of the catch 6, the hook component 11 forms an angled support surface 11a, which follows the inclined course of the catch 6, at a distance. The support surface 11a lies between the catch 6 and the back side of the instrument panel 1 or the cover plate 3.

During assembly, first the airbag module 7 and the hook component 11 are mounted on the support tube 9. The instrument panel 1 that is completed with the charge channel 5 is then emplaced such that the charge channel 5 is placed over the housing 10, and the catch 6 comes to rest behind the support surface 11a.

When the airbag is deployed, the airbag unfolds, directed through the charge channel 5 in the direction of the instrument panel 1, and moves to break open the cover plate 3, which is weakened by the groove 4. Due to the high levels of force this requires, the instrument panel 1 bends in the direction of the passenger compartment before breaking open the cover plate, carrying the charge channel 5, which is fastened to it, along with it. The catch 6, however, is stopped by the support surface 11a of the hook component 11. After a short distance, the catch is stopped by the support surface, which serves to limit the bending of the instrument panel. The initial distance between the support surface 11a and the catch 6 is designed such that, afterward, the deployment opening 10a still lies within the charge channel 5. Thus, no hole that could allow the airbag to partially unfold laterally behind the instrument panel is present between the housing 10 and the charge channel 5.

We claim:

1. A configuration of an airbag module behind an instrument panel of a motor vehicle, the airbag module comprising a gas generator and an airbag folded within a housing, wherein a charge channel is positioned in front of the airbag module, mounted on a back side of the instrument panel, and adapted to guide the airbag as it unfolds upon deployment, wherein, in an area of an airbag deployment opening, the charge channel loosely encompasses the housing, and wherein the charge channel is equipped with a catch on its outer side which, when the instrument panel is mounted, is positioned behind at least a portion of a hook component mounted to a part of a forward body structure of the motor vehicle such that, when the airbag deploys, the catch is supported against the portion of the hook component.

2. The configuration according to claim 1, wherein the part of the forward body structure of the motor vehicle is a support tube extending transversely to a direction of travel.

3. A configuration of an airbag module behind an instrument panel of a motor vehicle, the airbag module comprising a gas generator and an airbag folded within a housing, wherein a charge channel is positioned in front of the airbag module, mounted on a back side of the instrument panel, and adapted to guide the airbag as it unfolds upon deployment, wherein, in an area of an airbag deployment opening, the charge channel loosely encompasses the housing, wherein the charge channel is equipped with a catch on its outer side which, when the instrument panel is mounted, is positioned behind at least a portion of a hook component mounted to the motor vehicle such that, when the airbag deploys, the catch is supported against the portion of the hook component, wherein the airbag module is mounted on a support tube in forward body structure of the vehicle, wherein the charge channel is a rectangular channel, wherein the catch is provided at least on an outside of one channel wall, and wherein the hook component is mounted to the support tube.

4. The configuration according to claim 3, wherein the portion of the hook component is an end section that serves as a support surface, which is positioned between the catch and a back side of the instrument panel when the instrument panel is installed.

5. A process of assembling an airbag module behind an instrument panel of a motor vehicle, comprising:

mounting the airbag module, including at least a gas generator and an airbag folded within a housing, on a part of a forward body structure of the motor vehicle, and placing the instrument panel so that a charge channel is positioned in front of the air bag module and over the housing, so that, in an area of an airbag deployment opening, the charge channel loosely encompasses the housing, and so that a catch on an outer side of the charge channel is positioned behind at least a portion of a hook component mounted to the part of the forward body structure of the motor vehicle such that, when the airbag deploys, the catch is adapted to be supported against the portion of the hook component.

6. An assembled air bag module and instrument panel structure made by the process of claim 5.

7. The process according to claim 5, wherein the part of the forward body structure of the motor vehicle is a support tube extending transversely to a direction of travel.

8. A process of assembling an airbag module behind an instrument panel of a motor vehicle, comprising:

mounting the airbag module, including at least a gas generator and an airbag folded within a housing, on a support tube, and placing the instrument panel so that a charge channel is positioned in front of the air bag module and over the housing, so that, in an area of an airbag deployment opening, the charge channel loosely encompasses the housing, and so that a catch on an outer side of the charge channel is positioned behind at least a portion of a hook component mounted to the motor vehicle such that, when the airbag deploys, the catch is adapted to be supported against the portion of the hook component, wherein the support tube is in forward body structure of the vehicle, wherein the charge channel is a rectangular channel, wherein the catch is provided at least on an outside of one channel wall, and wherein the hook component is mounted to the support tube.

9. The process according to claim 8, wherein the portion of the hook component is an end section that serves as a support surface, which is positioned between the catch and a back side of the instrument panel when the instrument panel is installed.

10. An assembled air bag module and instrument panel structure made by the process of claim 9.

11. An assembled air bag module and instrument panel structure made by the process of claim 8.

* * * * *